US010124676B2

(12) United States Patent
Tajima et al.

(10) Patent No.: US 10,124,676 B2
(45) Date of Patent: Nov. 13, 2018

(54) VEHICLE CONTROLLER

(71) Applicant: TOYOTA JIDOSHA KABUSHIKI KAISHA, Toyota-shi, Aichi-ken (JP)

(72) Inventors: Yasuhiro Tajima, Nisshin (JP); Kunihiko Jinno, Toyota (JP); Haruki Oguri, Toyota (JP); Yoshikazu Motozono, Miyoshi (JP); Kiyomi Nagamiya, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 174 days.

(21) Appl. No.: 15/088,957

(22) Filed: Apr. 1, 2016

(65) Prior Publication Data

US 2016/0297322 A1 Oct. 13, 2016

(30) Foreign Application Priority Data

Apr. 7, 2015 (JP) .................................. 2015-078404

(51) Int. Cl.
| | |
|---|---|
| *B60L 15/20* | (2006.01) |
| *B60W 10/06* | (2006.01) |
| *B60L 7/16* | (2006.01) |
| *B60L 7/18* | (2006.01) |
| *B60L 11/14* | (2006.01) |

(52) U.S. Cl.
CPC .................. *B60L 7/16* (2013.01); *B60L 7/18* (2013.01); *B60L 11/14* (2013.01); *B60L 2240/12* (2013.01); *B60L 2240/461* (2013.01); *B60L 2250/26* (2013.01); *B60L 2270/12* (2013.01); *Y02T 10/70* (2013.01); *Y02T 10/7077* (2013.01); *Y02T 10/7258* (2013.01)

(58) Field of Classification Search
CPC ........... B60L 2240/12; B60L 2240/461; B60L 2240/14; B60L 2240/10; B60L 7/18; Y02T 10/7077; Y02T 10/70; Y02T 10/7258
See application file for complete search history.

(56) References Cited

U.S. PATENT DOCUMENTS

| | | | |
|---|---|---|---|
| 2002/0116099 A1* | 8/2002 | Tabata ..................... | B60K 6/32 701/22 |
| 2005/0128063 A1 | 6/2005 | Isaji et al. | |

(Continued)

FOREIGN PATENT DOCUMENTS

| | | |
|---|---|---|
| DE | 11 2010 006 042 T5 | 9/2013 |
| DE | 11 2011 104 757 T5 | 11/2013 |

(Continued)

OTHER PUBLICATIONS

May 9, 2017 Notification of Reasons for Refusal issued in Japanese Application No. 2015-078404.

*Primary Examiner* — Thomas G Black
*Assistant Examiner* — Demetra R Smith-Stewart
(74) *Attorney, Agent, or Firm* — Oliff PLC

(57) ABSTRACT

When a vehicle is in an accelerator off state and satisfies a free-run condition, a regeneration control unit performs free-run control on the vehicle so that the amount of regenerative electric power is decreased. The regeneration control unit sets a free-run prohibited zone between a starting point of a regeneration enhancement zone and a position that is located in front of and separated by a determination distance from the starting point.

7 Claims, 4 Drawing Sheets

(56) References Cited

U.S. PATENT DOCUMENTS

| | | | |
|---|---|---|---|
| 2012/0330505 A1* | 12/2012 | Tsumori | B60W 10/06 |
| | | | 701/36 |
| 2013/0211688 A1 | 8/2013 | Oguri et al. | |
| 2013/0245866 A1 | 9/2013 | Kuretake | |
| 2013/0289874 A1 | 10/2013 | Taguchi | |
| 2013/0325230 A1 | 12/2013 | Kim | |
| 2014/0142797 A1 | 5/2014 | Otake | |
| 2015/0006045 A1 | 1/2015 | Motozono et al. | |
| 2015/0019057 A1 | 1/2015 | Morisaki et al. | |
| 2015/0224992 A1 | 8/2015 | Dornieden et al. | |
| 2015/0232099 A1 | 8/2015 | Miller et al. | |

FOREIGN PATENT DOCUMENTS

| | | |
|---|---|---|
| DE | 10 2012 014 468 A | 5/2014 |
| JP | H06-070406 A | 3/1994 |
| JP | 2003-252193 A | 9/2003 |
| JP | 2005-165423 A | 6/2005 |
| JP | 2007-069787 A | 3/2007 |
| JP | 2008-074337 A | 4/2008 |
| JP | 2012-101636 A | 5/2012 |
| JP | 2013-210328 A | 10/2013 |
| JP | 2013-255411 A | 12/2013 |
| JP | 2014-110677 A | 6/2014 |
| JP | 2015-019521 A | 1/2015 |
| WO | 2012/053106 A1 | 4/2012 |
| WO | 2013/018198 A1 | 2/2013 |
| WO | 2013/093962 A1 | 6/2013 |
| WO | 2014/091591 A1 | 6/2014 |

\* cited by examiner

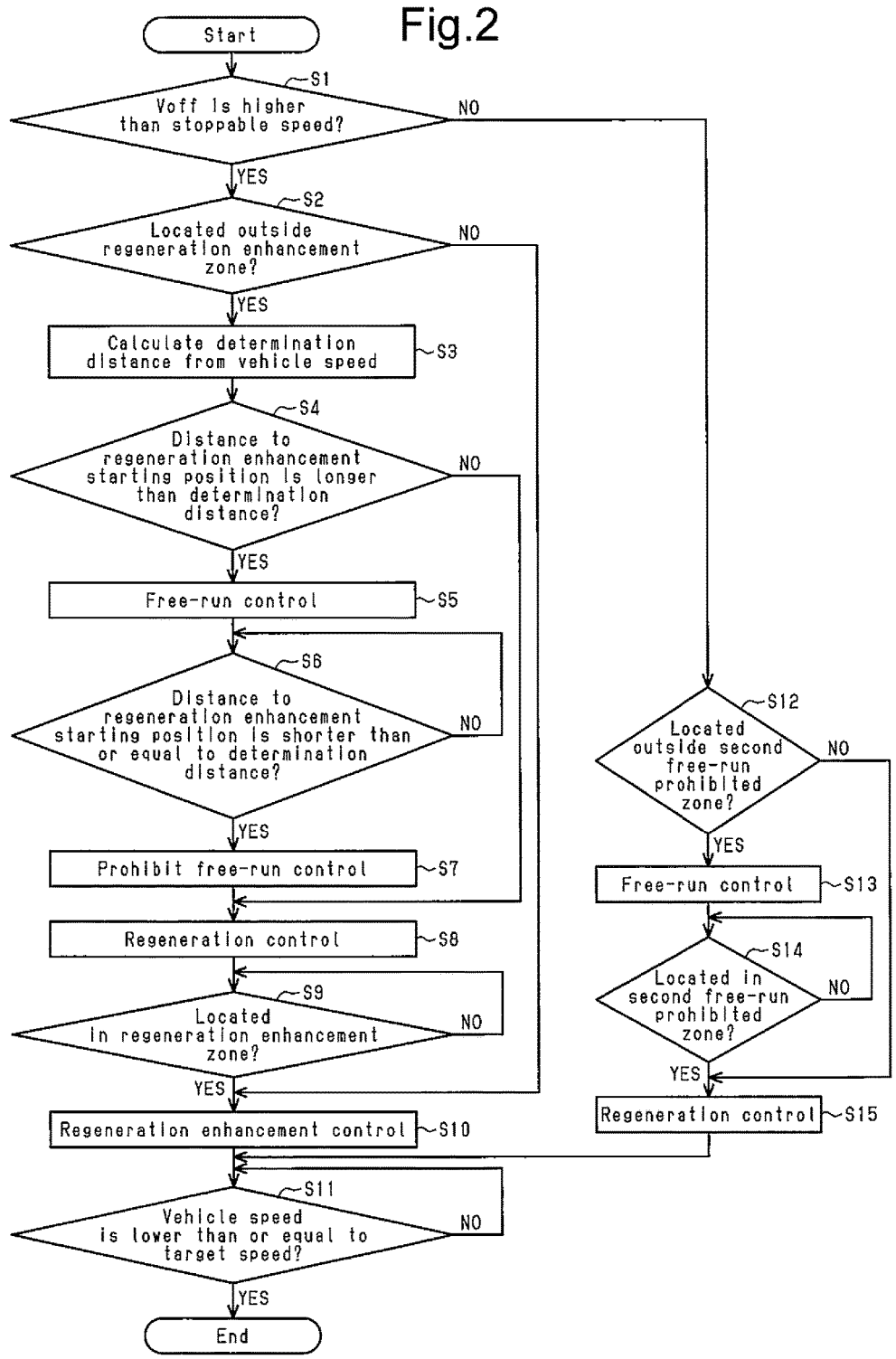

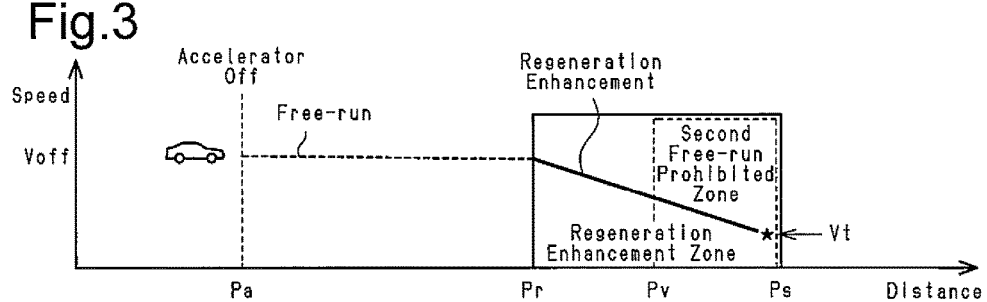
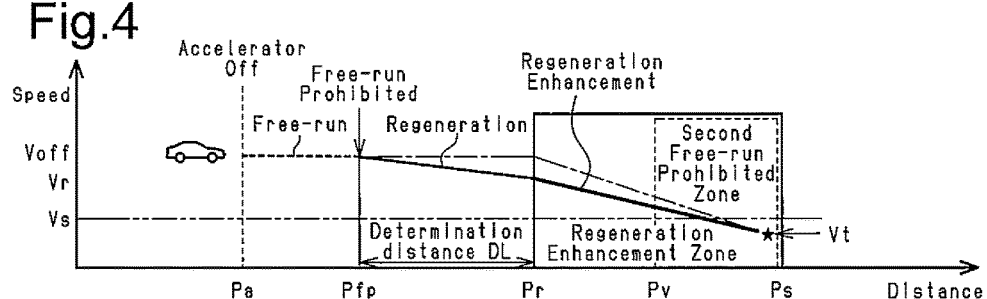
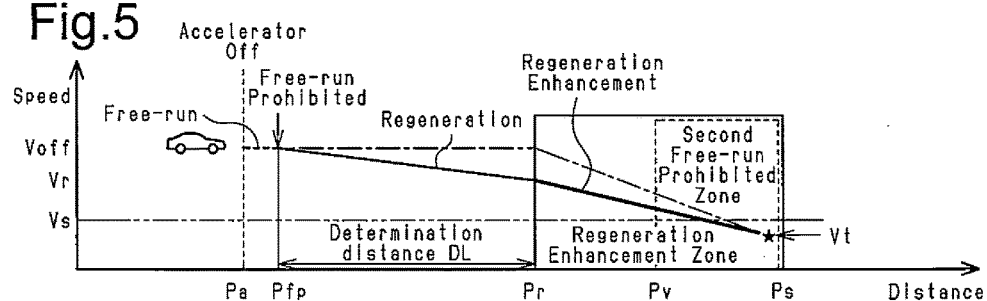
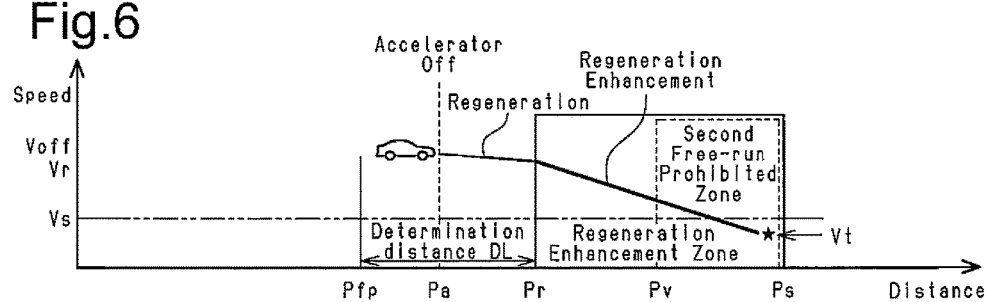

VEHICLE CONTROLLER

BACKGROUND OF THE DISCLOSURE

The present disclosure relates to vehicles, in particular, to a vehicle controller that controls a vehicle using a motor as a drive source and is able to run on electricity from a battery.

Electric vehicles and hybrid vehicles are well-known in the art. A hybrid vehicle uses an internal combustion engine and a motor as drive sources. Such a vehicle performs regeneration control when the vehicle is coasting to recover energy and reduce the speed.

Japanese Laid-Open Patent Publication No. 2014-110677 describes an example of a recently proposed device that performs regeneration enhancement control, which controls the deceleration rate of a vehicle during coasting by increasing the amount of regenerative electricity. In the device described in Japanese Laid-Open Patent Publication No. 2014-110677, when a stop point, where a vehicle needs to stop, is located in front of a traveling vehicle, the driver releases the accelerator to stop the vehicle at the stop point. This triggers the regeneration enhancement control to obtain a constant deceleration rate in correspondence with the increased regenerative energy.

It is an object of the present disclosure to provide a vehicle controller that improves regeneration control including regeneration enhancement control.

SUMMARY

One aspect of the present disclosure is a vehicle controller includes a regeneration control unit, a stop position obtaining unit, and a regeneration enhancement zone setting unit. The regeneration control unit is configured to perform regeneration control on a vehicle when the vehicle is in an accelerator off state. The stop position obtaining unit is configured to obtain a stop position of the vehicle from map data. The regeneration enhancement zone setting unit is configured to set a regeneration enhancement zone before the stop position. The regeneration control unit is configured to perform regeneration enhancement control, which increases a regenerative electric power amount of the vehicle, when the vehicle is in the accelerator off state and located in the regeneration enhancement zone. The regeneration control unit is configured to perform free-run control, which controls free-run of the vehicle so that the regenerative electric power amount is decreased, when the vehicle is in the accelerator off state and satisfies a free-run condition. The regeneration control unit is configured to set a free-run prohibited zone, where the free-run control is prohibited, between a starting point of the regeneration enhancement zone and a position that is located in front of and separated by a determination distance from the starting point.

If the free-run control is simply shifted to the regeneration enhancement control, the change in the deceleration rate of the vehicle may be annoying to the driver. In this regard, in the above configuration, when the vehicle reaches a position located in front of and separated by the determination distance from the position where the regeneration enhancement control is started, the free-run control is prohibited even when the vehicle is traveling under the free-run control. This controls the traveling of the vehicle. Thus, after the vehicle is actively decelerated through the regeneration control, the deceleration is performed through the regeneration enhancement control. This limits situations in which changes in the deceleration rate may be annoying to the driver. That is, the free-run control and the regeneration control including the regeneration enhancement control may be stably combined.

In contrast, the regeneration performed by the motor, the motor generator, or the like, may be reduced as much as possible during coasting of the vehicle. In this case, the regeneration does not actively produce braking force, and the traveling distance of the vehicle may be extended after the accelerator is released. Such a state in which the regeneration is not actively performed during coasting of the vehicle is referred to as free-run or the free-run state. Additionally, such a control performed during coasting of the vehicle is referred to as the free-run control. The free-run control is distinguished from a normal vehicle coasting resulting from a release of the accelerator. The normal vehicle coasting includes the regeneration control.

Although the free-run control may be performed in an electric vehicle, the free-run control is particularly beneficial in a hybrid vehicle to improve fuel efficiency and exhaust performance.

However, when a device such as that described in Japanese Laid-Open Patent Publication No. 2014-110677 is configured to stop the vehicle at a stop point when the accelerator is released, the regeneration control such as the regeneration enhancement control needs to be performed together with the free-run control. It is desired that these techniques be stably combined so that comfortable drivability is provided during deceleration in addition to the environmental and economic aspects. The above vehicle controller achieves such combination.

Preferably, in the above vehicle controller, when the free-run control is prohibited, the regeneration control unit is configured to perform the regeneration control to obtain a deceleration rate of the vehicle that is greater than that obtained by the free-run control.

In the above configuration, when the vehicle reaches a position located in front of and separated by the determination distance from the position where the regeneration enhancement control is started, the regeneration control is performed to obtain the deceleration rate that is greater than that obtained during the free-run control. Thus, the free-run control is shifted to the regeneration control and then to the regeneration enhancement control. This limits situations in which changes in the deceleration rate may be annoying to the driver.

Preferably, in the above vehicle controller, the regeneration control unit is configured to set the determination distance to be longer as a vehicle speed increases.

The deceleration rates of the vehicle obtained during the free-run control and the regeneration enhancement control are each generally constant. In the above configuration, the position in which the prohibition of the free-run control is started may be varied by setting the determination distance to be longer as the vehicle speed increases. Thus, for example, when a target speed is set so that the vehicle stops at a stop position, the vehicle speed may approach the target speed with further high accuracy.

Preferably, in the above vehicle controller, the regeneration control unit is configured to use a vehicle speed that is obtained when an accelerator of the vehicle is released as the vehicle speed used to set the determination distance.

In the above configuration, the determination distance is determined based on the vehicle speed obtained when the accelerator of the vehicle is released. As described above, the deceleration rate of the vehicle obtained during the free-run control is generally constant. Thus, the vehicle speed that is obtained when the free-run control is started is used to set the determination distance. This increases the accuracy for setting the variable determination distance.

Preferably, in the above vehicle controller, the regeneration control unit is configured to perform the regeneration control in the free-run prohibited zone so that a deceleration rate of the vehicle is variable in accordance with the determination distance.

In the above configuration, in the free-run prohibited zone, which is set between the starting position of the regeneration enhancement control and the position located in front of and separated by the determination distance from the starting position, the deceleration rate of the vehicle obtained by the regeneration control is variable in accordance with the determination distance. This allows for further smooth changes in the deceleration rate until the vehicle starts the regeneration enhancement control.

Preferably, in the above vehicle controller, the regeneration control unit is configured to perform the regeneration control in the free-run prohibited zone when an accelerator of the vehicle is released in the free-run prohibited zone.

Release of the accelerator in a zone, which is set between the starting position of the regeneration enhancement control and the position located in front of and separated by the determination distance from the starting position, indicates that the vehicle has passed the position in which the free-run control is to be performed. In this regard, in the above configuration, the regeneration control is performed in the above zone. Thus, after the vehicle is decelerated under the regeneration control, the vehicle may be further smoothly decelerated under the regeneration enhancement control.

Preferably, in the above vehicle controller, the free-run prohibited zone includes a first free-run prohibited zone. The regeneration control unit is configured to set a second free-run prohibited zone before the stop position so that the vehicle, which is traveling under the free-run control, is stoppable at the stop position. When a vehicle speed that is obtained when an accelerator of the vehicle is released is lower than or equal to a speed at which the vehicle is stoppable at the stop position, the regeneration control unit is configured to continue the free-run control until the vehicle enters the second free-run prohibited zone.

If the vehicle speed obtained when the accelerator is released is lower than or equal to the stoppable speed, at which the vehicle is stoppable at the stop position, and the regeneration control or the regeneration enhancement control is performed, the vehicle stops before reaching the stop position. That is, the accelerator needs to be depressed again so that the vehicle reaches the target stop position. In this regard, in the above configuration, under this situation, the free-run control is continued until the vehicle enters the second free-run prohibited zone. This improves the vehicle traveling control in terms of environmental and economic aspects.

Preferably, in the above vehicle controller, the regeneration control unit is configured to perform the regeneration enhancement control that decreases a vehicle speed to a target speed that is set to stop the vehicle at the stop position. The regeneration control unit is configured to calculate the starting point of the regeneration enhancement zone based on a deceleration rate obtained by the regeneration enhancement control, a pre-enhancement speed, which is a vehicle speed obtained before the regeneration enhancement control is performed, and a remaining distance, which is needed to decrease the vehicle speed from the pre-enhancement speed to the target speed.

In the above configuration, even when an intersection, at which the vehicle needs to be stopped once, or a railroad crossing is set as a target stop position, the starting position of the regeneration enhancement control necessary to stop the vehicle at the stop position is accurately set based on the vehicle speed prior to the regeneration enhancement control and the remaining distance.

Other aspects and advantages of the disclosure will become apparent from the following description, taken in conjunction with the accompanying drawings, illustrating by way of example the principles of the disclosure.

BRIEF DESCRIPTION OF THE DRAWINGS

The disclosure, together with objects and advantages thereof, may best be understood by reference to the following description of the presently preferred embodiments together with the accompanying drawings in which:

FIG. 2 is a flowchart showing the procedures of a deceleration process performed by the vehicle controller of the embodiment;

FIG. 3 is a graph showing an example of the deceleration process controlled by the vehicle controller of the embodiment;

FIG. 4 is a graph showing an example of the deceleration process controlled by the vehicle controller of the embodiment;

FIG. 5 is a graph showing an example of the deceleration process controlled by the vehicle controller of the embodiment;

FIG. 6 is a graph showing an example of the deceleration process controlled by the vehicle controller of the embodiment;

DETAILED DESCRIPTION OF THE PREFERRED EMBODIMENTS

One embodiment of a vehicle controller will now be described with reference to FIGS. 1 to 9. The vehicle controller of the present embodiment corresponds to a device that is installed in a vehicle 10 and controls the traveling of the vehicle 10. An example of the vehicle 10 is a hybrid vehicle, which includes an internal combustion engine 11 and a motor 12 as drive sources.

Figure 1:
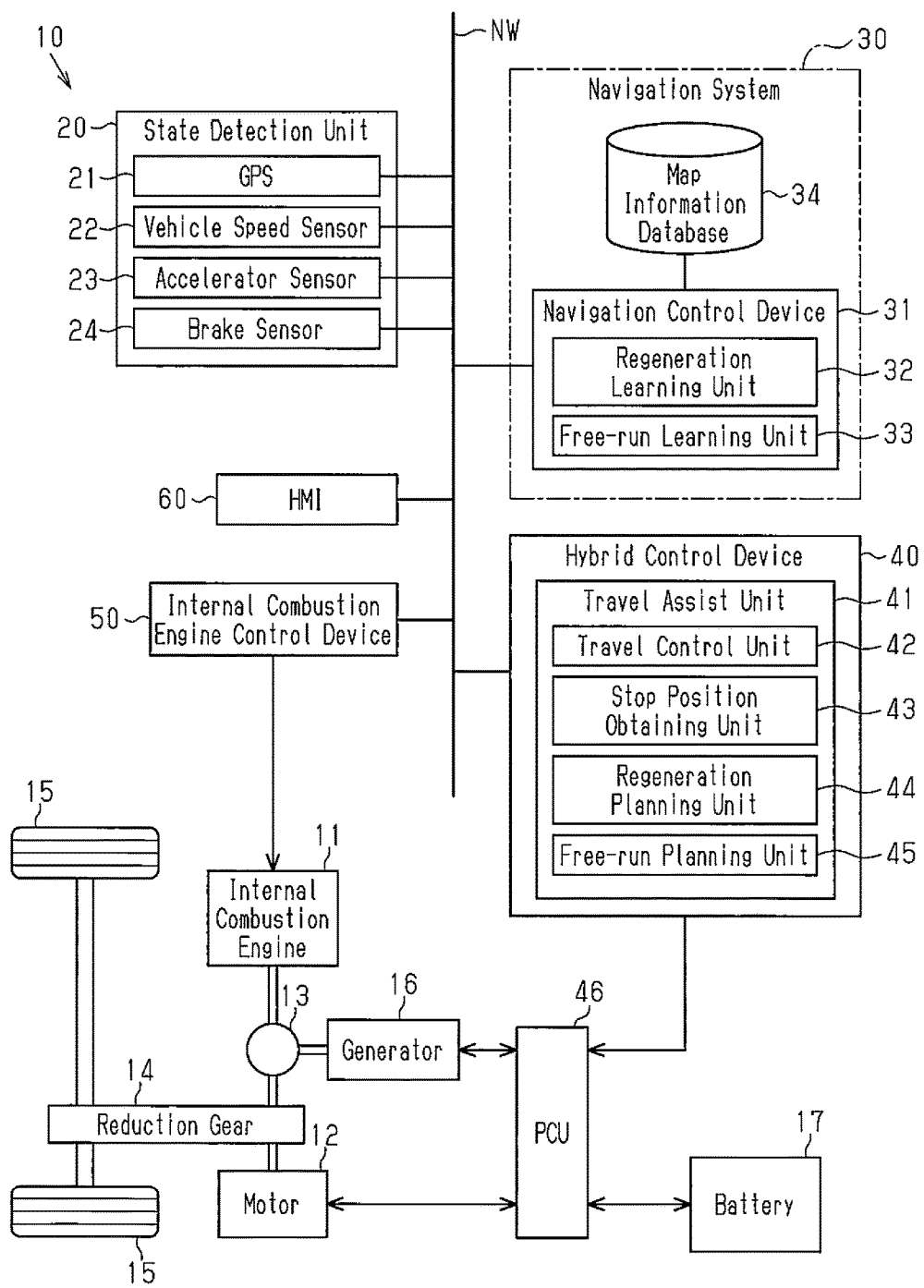
FIG. 1 is a schematic block diagram showing the structure of one embodiment of a vehicle controller.

As shown in FIG. 1, the vehicle controller is installed in the vehicle 10 that includes the internal combustion engine 11 and the motor 12 as drive sources. The internal combustion engine 11 is mechanically connected to wheels 15 by a power distribution mechanism 13 and a reduction gear 14. The internal combustion engine 11 is also mechanically connected by the power distribution mechanism 13 to a generator 16, which converts some of the power generated by the internal combustion engine 11 to electricity.

The electricity is supplied to the motor 12 from a battery 17, which serves as a power source, through a power control unit 46 (PCU) including an inverter, a boost converter, and the like. The battery 17 is a rechargeable secondary battery. The motor 12, which is mechanically connected to the wheels 15 by the reduction gear 14, functions as an electric motor that transmits rotation force to the wheels 15. Additionally, the motor 12 functions as a generator. When generating electricity from the rotation force transmitted from the wheels 15, the motor 12 performs regenerative braking that applies braking force on the wheels 15.

The vehicle 10 includes a state detection unit 20 and the like as a component that obtains information of the state of the vehicle 10. Such a component is connected to various control devices, including an internal combustion engine control device 50, a hybrid control device 40, a navigation control device 31, and the like, for example, by an in-vehicle network NW such as a controller area network (CAN). The internal combustion engine control device 50 controls the driving of the internal combustion engine 11. The hybrid control device 40 controls the driving of the motor 12 via the power control unit 46. Each of the various control devices is the so-called electronic control unit (ECU) and includes a microcomputer having an arithmetic unit and a memory. Each control device includes a control circuit that performs various controls when the arithmetic unit arithmetically processes programs and parameters, which are stored in the memory.

The state detection unit 20 detects the current position and the current state of the vehicle 10. The state detection unit 20 includes, for example, a global positioning system 21 (GPS). The GPS 21 receives a GPS satellite signal and specifies the current position of the vehicle 10 based on the received GPS satellite signal. The state detection unit 20 outputs information indicating the specified current position, for example, the latitude and longitude of the current position. In addition to or instead of the GPS satellite signal, the state detection unit 20 may be configured to detect the current position of the vehicle 10 using a different satellite signal or a road-to-vehicle communication system.

The state detection unit 20 includes a vehicle speed sensor 22, an accelerator sensor 23, and a brake sensor 24. The vehicle speed sensor 22 detects the vehicle speed from the rotation speed of the wheels. The accelerator sensor 23 detects whether or not a driver is depressing an accelerator and the acceleration amount, which is the depression amount of the accelerator. The brake sensor 24 detects whether or not the driver is depressing a brake pedal and the braking amount, which is the depression amount of the brake pedal. The vehicle speed sensor 22, the accelerator sensor 23, and the brake sensor 24 are also connected to the in-vehicle network NW by a communication system (not shown).

The vehicle 10 includes human machine interfaces 60 (HMIs), which output drive assist information or the like received from a travel assist unit 41. The HMIs 60 include, for example, a monitor, a head-up display, a meter panel, and the like. The HMIs 60 may share a monitor with a navigation system 30.

The vehicle 10 includes the navigation system 30, which guides a traveling route of the vehicle 10. The navigation system 30 includes a map information database 34, which stores map information, and the navigation control device 31, which performs a guiding process of the traveling route of the vehicle 10 using the map information stored in the map information database 34.

The map information stored in the map information database 34 includes node information, related to nodes indicating positions on roads, and link information, related to links connecting two adjacent nodes. The node information includes position information of the nodes and road information of the nodes. The link information includes road information of the links. The road information includes information of stop positions Ps at which the vehicle 10 needs to stop. The stop positions Ps include positions where traffic regulation elements are located and positions calculated from the locations of humans. Examples of traffic regulation elements are a signalized intersection, a stop line, a stop sign, a one-way street, and a crosswalk. More specifically, locations of the traffic regulation elements that exist ahead of the vehicle in the traveling direction are specified based on the latitude and longitude information of the traffic regulation elements contained in the map information and the latitude and longitude information of the vehicle detected by the GPS 21. Additionally, types and locations of the traffic regulation elements that exist ahead of the vehicle in the traveling direction may be specified by analyzing an image of the surrounding of the vehicle captured by an in-vehicle camera. Further, types and locations of the traffic regulation elements that exist ahead of the vehicle in the traveling direction may be specified based on infrastructure information received from an in-vehicle communication device.

The navigation control device 31 obtains the information indicating the current position of the vehicle 10 from the GPS 21 of the state detection unit 20. When a destination is set by the driver or the like, the navigation control device 31 searches a traveling route from the starting point of the vehicle 10 to the destination with reference to the map information database 34 using Dijkstra's algorithm or the like.

The navigation control device 31 includes a regeneration learning unit 32, which provides information for assisting regeneration control of the vehicle 10 so that the vehicle 10 stops at the stop positions Ps, and a free-run learning unit 33, which provides information for assisting free-run control of the vehicle 10 so that the vehicle 10 stops at the stop positions Ps. The navigation control device 31 outputs the road information contained in the searched traveling route, together with the assist information of the regeneration control and the assist information of the free-run control related to the stop positions Ps contained in the road information, to the hybrid control device 40 via the in-vehicle network NW.

The vehicle 10 includes the battery 17, serving as the power source of the motor 12, and the power control unit 46, which controls the charging and discharging of the battery 17. The power control unit 46 is connected to various control devices such as the internal combustion engine control device 50, the hybrid control device 40, and the navigation control device 31 by the in-vehicle network NW.

The hybrid control device 40 functions to set the present distribution of the drive force or the output ratio for the internal combustion engine 11 and the motor 12. Additionally, the hybrid control device 40 functions to perform the drive assist based on the traveling route and the travel assist so that the vehicle 10 stops at the stop positions Ps of the traveling route.

More specifically, the hybrid control device 40 sets the distribution of the drive force based on, for example, a detection result of the state detection unit 20. Based on the distribution of the drive force, the hybrid control device 40 generates a control instruction of the power control unit 46 related to the discharging or the like of the battery 17 and information related to the control amount of the internal combustion engine 11 that is calculated by the internal combustion engine control device 50. The hybrid control device 40 sets the distribution of the braking force for the brake and the motor 12 based on detection results of the vehicle speed sensor 22, the accelerator sensor 23, and the brake sensor 24. Based on the distribution of the braking force, the hybrid control device 40 generates a control instruction of the power control unit 46 related to the charging or the like of the battery 17 and information related to the control amount of the brake that is calculated by the internal combustion engine control device 50. That is, when outputting the generated control instructions to the power control unit 46, the hybrid control device 40 controls the charging and discharging of the battery 17. More specifically, the discharging of the battery 17, serving as the power source of the motor 12, drives the motor 12, and the regeneration of the motor 12 charges the battery 17.

The hybrid control device 40 includes the travel assist unit 41, which outputs the travel assist information of the vehicle 10 corresponding to the traveling route of the vehicle 10 that is received from the navigation control device 31. The travel assist unit 41 includes a travel control unit 42, which performs a travel control so that the vehicle 10 stops at the stop positions Ps of the traveling route. The travel control unit 42 functions as a regeneration control unit, which performs the regeneration control.

The travel assist unit 41 includes a stop position obtaining unit 43, which obtains the stop positions Ps. The stop position obtaining unit 43 obtains the stop positions Ps from the map information registered in the map information database 34.

The travel assist unit 41 includes a regeneration planning unit 44, which plans the regeneration control including the regeneration enhancement control. The regeneration planning unit 44 plans the regeneration control including the regeneration enhancement control based on the assist information of the regeneration learning unit 32 of the navigation control device 31. The regeneration planning unit 44 also functions as a regeneration enhancement zone setting unit, which sets a regeneration enhancement zone, where the regeneration enhancement control is performed to increase the amount of, regenerative electricity, before a stop position Ps.

The travel assist unit 41 includes a free-run planning unit 45, which plans the free-run control. The free-run planning unit 45 plans the free-run control based on the assist information of the free-run learning unit 33 of the navigation control device 31.

The travel control unit 42 controls the traveling of the vehicle 10 based on the plans of the regeneration planning unit 44 and the free-run planning unit 45 and in accordance with the road information of the traveling route.

When the driver does not operate the accelerator, that is, the vehicle 10 is in an accelerator off state, the vehicle 10 is in a coasting state, in which the speed is not increased by the internal combustion engine 11 or the motor 12. During this time, the travel control unit 42 performs the regeneration control, or regenerative braking, in which the regeneration of the motor 12 decreases the speed of the vehicle 10 as charging the battery 17.

When the vehicle is coasting, the driver may wish to increase the deceleration rate of the vehicle 10, for example, when the distance is short from the vehicle 10 to the stop position Ps. In such a case, the travel control unit 42 performs the regeneration enhancement control, in which the regenerative electric power amount is increased during coasting of the vehicle 10. The regenerative electric power amount of the regeneration enhancement control is greater than that of the regeneration control. Accordingly, the deceleration rate of the regeneration enhancement control is greater than that of the regeneration control. To stop the vehicle 10 at the stop position Ps, the regeneration enhancement control is performed in the regeneration enhancement zone Pr-Ps, which corresponds to a range including the distance that allows the vehicle 10 to decelerate to a target speed Vt before reaching a stop position Ps. When the vehicle 10 enters the regeneration enhancement zone Pr-Ps, the travel control unit 42 performs the regeneration enhancement control. The regeneration enhancement zone Pr-Ps, where the regeneration enhancement control is performed, includes a starting position Pr. The starting position Pr is calculated based on a pre-enhancement speed Vr, which corresponds to the speed of the vehicle 10 before the regeneration enhancement control is started, and a remaining distance "Ps-Pr" that is needed to decrease the vehicle speed from the pre-enhancement speed Vr to the target speed Vt so that the vehicle 10 stops at the stop position Ps. An example of the pre-enhancement speed Vr is the vehicle speed at the starting position Ps.

Also, when the vehicle is coasting, the driver may wish to extend a traveling distance of the vehicle 10, for example, when the distance is long from the vehicle 10 to the stop position Ps. In such a case, the travel control unit 42 performs the free-run control, in which the regenerative electric power amount is decreased during coasting of the vehicle 10. The travel control unit 42 has the vehicle 10 travel without performing regeneration, that is, in a non-regeneration condition, so that the regenerative electric power amount is decreased. Since the free-run control does not perform regeneration, the deceleration rate of the free-run control is usually much smaller than that of the regeneration control. During the free-run control, the power of the internal combustion engine 11 is separated from the reduction gear 14 by the power distribution mechanism 13. The free-run control is performed when the vehicle 10 is in the accelerator off state and located outside a second free-run prohibited zone Pv-Ps. The second free-run prohibited zone Pv-Ps is set in a range of a fixed distance relative to the stop position Ps that is needed for the vehicle 10 to decelerate and stop at the stop position Ps. The travel control unit 42 performs the free-run control when the vehicle 10 is in the accelerator off state. Then, the travel control unit 42 stops the free-run control and performs the regeneration control when the vehicle 10 enters the second free-run prohibited zone Pv-Ps. The second free-run prohibited zone Pv-Ps corresponds to a zone in which the free-run control is not performed.

As shown in FIG. 3, in the vehicle 10, the free-run control may be started at an accelerator off position Pa, at which the vehicle 10 shifts to the accelerator off state, and then changed to the regeneration enhancement control when the vehicle 10 approaches the stop position Ps and enters the regeneration enhancement zone Pr-Ps. When the vehicle 10 is controlled in such a manner, the deceleration rate of the vehicle 10 drastically changes when shifting from the free-run control to the regeneration enhancement control. This may be annoying to the driver.

In this regard, in the vehicle controller of the present embodiment, a first free-run prohibited zone Pfp-Pr is set between the regeneration enhancement starting position Pr, at which the regeneration enhancement control is started, and a position located in front of and separated by the determination distance DL from the regeneration enhancement starting position Pr. In the first free-run prohibited zone Pfp-Pr, the travel control unit 42 prohibits the free-run control and performs the regeneration control, which obtains the deceleration rate of the vehicle 10 that is greater than that obtained during the free-run control.

More specifically, as shown in FIGS. 4 and 5, the travel control unit 42 starts the free-run control in the accelerator off position Pa, at which the vehicle 10 shifts to the accelerator off state. Then, the travel control unit 42 prohibits the free-run control and performs the regeneration control when the vehicle 10 reaches the position Pfp, which is located in front of and separated by the determination distance DL from the regeneration enhancement starting position Pr, and performs the regeneration enhancement control when the vehicle 10 enters the regeneration enhancement zone Pr-Ps.

As shown in FIG. 6, when the distance between the accelerator off position Pa, at which the vehicle 10 shifts to the accelerator off state, and the regeneration enhancement starting position Pr is shorter than or equal to the determination distance DL, the travel control unit 42 performs the regeneration control, rather than the free-run control, to obtain the deceleration rate of the vehicle 10 that is greater than that obtained during the free-run control. Then, when the vehicle 10 enters the regeneration enhancement zone Pr-Ps, the travel control unit 42 performs the regeneration enhancement control. That is, the regeneration control is performed in the first free-run prohibited zone Pfp-Pr, which is set between the regeneration enhancement starting position Pr and the position Pfp, located in front of and separated by the determination distance DL from the regeneration enhancement starting position Pr.

Figure 7:
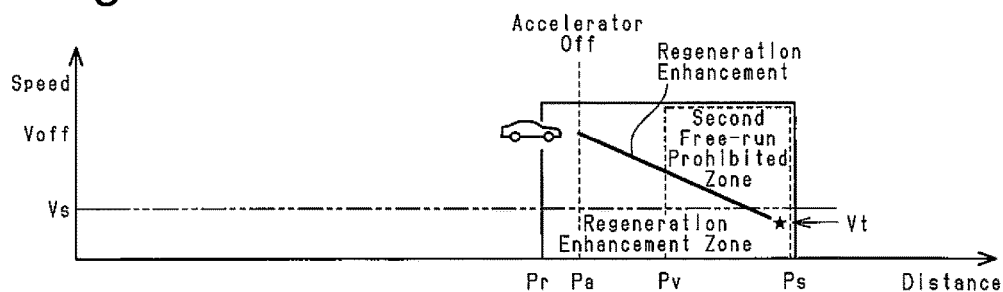
FIG. 7 is a graph showing an example of the deceleration process controlled by the vehicle controller of the embodiment.

As shown in FIG. 7, when the accelerator off position Pa, at which the vehicle 10 shifts to the accelerator off state, is located in the regeneration enhancement zone Pr-Ps, the travel control unit 42 immediately performs the regeneration enhancement control.

The operation of the vehicle controller, which is mainly performed by the travel control unit 42, will now be described in detail with reference to the drawings including FIG. 2. The travel control unit 42 performs the regeneration control and the free-run control based on the plans provided by the regeneration planning unit 44 and the free-run planning unit 45 and in accordance with the road information of the traveling route or the like. Here, the description will focus on a case in which the free-run control and the regeneration enhancement control are both performed before the vehicle 10 stops at the stop position Ps.

When the stop position Ps is located ahead in the traveling route and the travel control unit 42 detects that the accelerator is released, that is, the accelerator off state, based on an output of the accelerator sensor 23, the travel control unit 42 starts to control a deceleration process so that the vehicle 10 stops at the stop position Ps. More specifically, the travel control unit 42 decelerates the vehicle 10 to the target speed Vt before reaching the stop position Ps (e.g., refer to FIG. 4). This efficiently collects the kinetic energy as electric energy. The driver depresses the brake after the target speed Vt is reached. Thus, the vehicle 10 may be effortlessly stopped at the stop position Ps.

As shown in FIG. 2, when detecting the accelerator off state, the travel control unit 42 determines whether or not an accelerator off speed Voff, which corresponds to the speed of the vehicle 10 that is obtained when the accelerator off state is detected, is higher than a stoppable speed Vs (step S1). More specifically, the vehicle 10 needs to be decelerated when the vehicle 10 is traveling at the accelerator off speed Voff that is higher than the stoppable speed Vs (e.g., refer to FIG. 4), which allows the vehicle 10 to effortlessly stop at the stop position Ps. Thus, the travel control unit 42 per- forms the regeneration enhancement control in a location before the stop position Ps. In contrast, when the vehicle 10 is traveling at the accelerator off speed Voff that is lower than or equal to the stoppable speed Vs, the vehicle 10 does not need to be actively decelerated. Thus, the travel control unit 42 does not perform the regeneration enhancement control in the location before the stop position Ps. The stoppable speed Vs is higher than the target speed Vt but not high enough to be actively decreased by the regeneration enhancement control.

When determining that the accelerator off speed Voff, which is the vehicle speed obtained when the accelerator is released, is higher than the stoppable speed Vs (step S1: YES), the travel control unit 42 determines whether or not the vehicle 10 is located outside the regeneration enhancement zone Pr-Ps (step S2). More specifically, when detecting the accelerator off state, the travel control unit 42 performs the free-run control. However, if the vehicle 10 is located in the regeneration enhancement zone Pr-Ps, it is desirable that the regeneration enhancement control be performed. Thus, the travel control unit 42 determines whether or not the vehicle 10 is located outside the regeneration enhancement zone Pr-Ps. When determining that the vehicle 10 is located in the regeneration enhancement zone Pr-Ps (step S2: NO), the travel control unit 42 does not perform the free-run control and performs the regeneration enhancement control (step S10).

Figure 9:
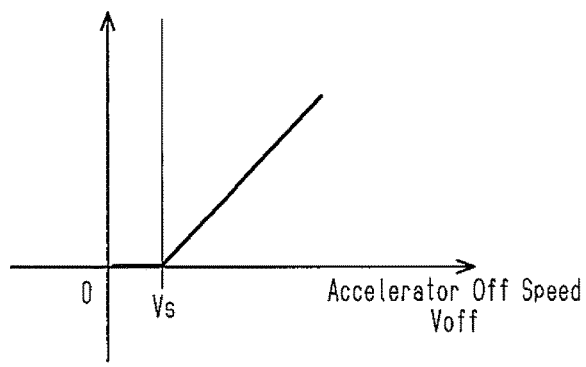
FIG. 9 is a graph showing the relationship between a vehicle speed and a determination distance from where a regeneration enhancement control is started in the deceleration process controlled by the vehicle controller of the embodiment.

When determining that the vehicle 10 is located outside the regeneration enhancement zone Pr-Ps (step S2: YES), the travel control unit 42 calculates the determination distance DL, which is a predetermined interval in which the free-run control is prohibited or the control mode is changed, based on the accelerator off speed Voff (step S3). More specifically, as shown in FIG. 9, when the accelerator off speed Voff is higher than or equal to the stoppable speed Vs, the determination distance DL is set to be longer as the speed of the vehicle 10 increases. Use of the accelerator off speed Voff in this manner increases the accuracy for setting the variable determination distance DL. The determination distance may be determined based on the speed of the vehicle 10 subsequent to coasting instead of the accelerator off speed Voff.

The travel control unit 42 determines whether or not the distance between the accelerator off position Pa, where the accelerator off state is detected, and the regeneration enhancement starting position Pr is longer than the determination distance DL (step S4) to determine whether or not the free-run control can be performed. When determining that the distance between the accelerator off position Pa, where the accelerator off state is detected, and the regeneration enhancement starting position Pr is shorter than or equal to the calculated determination distance DL (step S4: NO), the travel control unit 42 does not perform the free-run control and performs the regeneration control (step S8). Here, the regeneration control is performed to obtain the deceleration rate of the vehicle 10 that is greater than that obtained during the free-run control. For example, the deceleration rate is changed by adjusting the regenerative electric power amount.

When determining that the distance between the accelerator off position Pa, where the accelerator off state is detected, and the regeneration enhancement starting position Pr is longer than the calculated determination distance DL (step S4: YES), the travel control unit 42 performs the free-run control (step S5). That is, the travel control unit 42 determines that the vehicle 10 is located in a position in which the free-run control can be performed and performs the free-run control, which does not perform regeneration during coasting.

The travel control unit 42 continues the free-run control until the vehicle 10 reaches the determination distance DL. When determining that the distance to the regeneration enhancement starting position Pr is shorter than or equal to the determination distance DL (step S6: YES), the travel control unit 42 prohibits the free-run control (step S7) and performs the regeneration control (step S8). As described above, the regeneration control is performed to obtain the deceleration rate of the vehicle 10 that is greater than that obtained during the free-run control.

Subsequently, the travel control unit 42 determines whether or not the vehicle 10 is located in the regeneration enhancement zone Pr-Ps (step S9). The travel control unit 42 continues the regeneration control until the travel control unit 42 determines that the vehicle 10 is located in the regeneration enhancement zone Pr-Ps.

When determining that the vehicle 10 is located in the regeneration enhancement zone Pr-Ps (step S9: YES), the travel control unit 42 performs the regeneration enhancement control to decrease the speed of the vehicle 10 to the target speed Vt at a constant deceleration rate that is greater than that obtained during the regeneration control (step S10). The travel control unit 42 continues the regeneration enhancement control while determining whether or not the speed of the vehicle 10 is lower than or equal to the target speed Vt. When the speed of the vehicle 10 is decreased to the target speed Vt (step S11: YES), the travel control unit 42 stops the regeneration enhancement control.

On the other hand, when determining that the accelerator off speed Voff is lower than or equal to the stoppable speed Vs (step S1: NO), the travel control unit 42 determines whether or not the vehicle 10 is located outside the second free-run prohibited zone Pv-Ps (step S12) to determine whether or not the free-run control can be performed. As described above, the second free-run prohibited zone Pv-Ps corresponds to a free-run interruption area in which the free-run control is stopped to decelerate the vehicle 10 so that the vehicle 10 is stoppable at the stop position Ps. When determining that the vehicle 10 is located in the second free-run prohibited zone Pv-Ps (step S12: NO), the travel control unit 42 stops the free-run control and performs the regeneration control (step S15). More specifically, the travel control unit 42 performs the regeneration control to decrease the speed of the vehicle 10 to the target speed Vt at the constant deceleration rate.

When determining that the vehicle 10 is located outside the second free-run prohibited zone Pv-Ps (step S12: YES), the travel control unit 42 performs the free-run control (step S13). That is, when performing the free-run control, the travel control unit 42 functions to extend the traveling distance of the vehicle 10 after the accelerator is released. The travel control unit 42 continues the free-run control until the vehicle 10 is located in the second free-run prohibited zone Pv-Ps.

When determining that the vehicle 10 is located in the second free-run prohibited zone Pv-Ps (step S14: YES), the travel control unit 42 stops the free-run control and performs the regeneration control (step S15). More specifically, the travel control unit 42 performs the regeneration control to decrease the speed of the vehicle 10 to the target speed Vt at the constant deceleration rate. In step S11, when the speed of the vehicle 10 is decreased to the target speed Vt (step S11: YES), the deceleration is not necessary. Thus, the travel control unit 42 stops the regeneration control.

The deceleration process of the vehicle 10 relative to the stop position Ps will now be described in detail with reference to FIGS. 4 to 8.

FIGS. 4 and 5 each show an example of the control mode for decelerating the vehicle 10 when the accelerator off speed Voff is higher than the stoppable speed Vs and the accelerator is released at a distance sufficiently separated from the stop position Ps. The "distance sufficiently separated from the stop position Ps" is greater than the determination distance DL. In this case, the travel control unit 42 determines that the accelerator off speed Voff is higher than the stoppable speed Vs (step S1 of FIG. 2: YES), the vehicle 10 is located outside the regeneration enhancement zone Pr-Ps (step S2 of FIG. 2: YES), and the distance between the vehicle 10 and the regeneration enhancement starting position Pr is longer than the determination distance DL (step S4 of FIG. 2: YES), which is calculated from the accelerator off speed Voff (step S3 of FIG. 2). Thus, the travel control unit 42 performs the free-run control (step S5 of FIG. 2). Due to the free-run control, the vehicle 10 continues coasting with subtle deceleration.

The accelerator off speed Voff of FIG. 5 at the accelerator position Pa is higher than that of FIG. 4. More specifically, since the determination distance DL is set to be longer as the accelerator off speed Voff increases, the determination distance DL of FIG. 5 is set longer than that of FIG. 4. That is, when the free-run control is prohibited earlier as the accelerator off speed Voff increases, the deceleration amount of the vehicle 10 may be increased. This allows the deceleration rate of FIG. 5, which has a long regeneration interval, to be smaller than the deceleration rate of FIG. 4.

When the vehicle 10 reaches the position Pfp, which is located in front of and separated by the determination distance DL from the regeneration enhancement starting position Pr (step S6 of FIG. 2: YES), the travel control unit 42 prohibits the free-run control (step S7 of FIG. 2) and performs the regeneration control (step S8 of FIG. 2). Due to the regeneration control, the vehicle 10 continues coasting as decelerating at the deceleration rate that is greater than that obtained during the free-run control.

Subsequently, when the vehicle 10 enters the regeneration enhancement zone Pr-Ps (step S9 of FIG. 2: YES), the travel control unit 42 performs the regeneration enhancement control (step S10 of FIG. 2). Due to the regeneration enhancement control, the vehicle 10 continues coasting as decelerating at the constant deceleration rate that is greater than that obtained during the regeneration control so that the speed of the vehicle 10 becomes the target speed Vt before reaching the stop position Ps.

More specifically, when the accelerator is released, the vehicle 10 is triggered to perform the free-run control. Then, the free-run control is shifted to the regeneration control in the first free-run prohibited zone Pfp-Pr set between the regeneration enhancement zone Pr-Ps and the position Pfp, which is located in front of and separated by the determination distance DL from the regeneration enhancement zone Pr-Ps. Then, the vehicle 10 performs the regeneration enhancement control in the regeneration enhancement zone Pr-Ps. In this manner, the regeneration control is performed between the free-run control and the regeneration enhancement control. This decreases changes in the deceleration rate when shifting the control mode and limits situations in which the changes in the deceleration rate may be annoying to the driver. Additionally, when the deceleration rate of the vehicle 10 is variable in accordance with the set determination distance DL, the deceleration rate further smoothly changes until the regeneration enhancement control is started.

FIG. 6 shows the control mode for decelerating the vehicle 10 when the accelerator off speed Voff is higher than the stoppable speed Vs and the accelerator is released in a zone, which is set between the regeneration enhancement starting position Pr and the position Pfp located in front of and separated by the determination distance DL from the regeneration enhancement starting position Pr. In this case, the travel control unit 42 determines that the accelerator off speed Voff is higher than the stoppable speed Vs (step S1 of FIG. 2: YES), the vehicle 10 is located outside the regeneration enhancement zone Pr-Ps (step S2 of FIG. 2: YES), and the distance between the vehicle 10 and the regeneration enhancement starting position Pr is shorter than the determination distance DL (step S4 of FIG. 2: NO), which is calculated from the accelerator off speed Voff (step S3 of FIG. 2). Thus, the travel control unit 42 does not perform the free-run control and performs the regeneration control (step S8 of FIG. 2). Due to the regeneration control, the vehicle 10 continues coasting as decelerating at the deceleration rate that is greater than that obtained during the free-run control.

Subsequently, when the vehicle 10 enters the regeneration enhancement zone Pr-Ps (step S9 of FIG. 2: YES), the travel control unit 42 performs the regeneration enhancement control (step S10 of FIG. 2). Due to the regeneration enhancement control, the vehicle 10 continues coasting as decelerating at the constant deceleration rate that is greater than that obtained during the regeneration control so that the speed of the vehicle 10 becomes the target speed Vt before reaching the stop position Ps.

More specifically, when the accelerator is released, the vehicle 10 is triggered to perform the regeneration control in the first free-run prohibited zone Pfp-Pr set between the regeneration enhancement zone Pr-Ps and the position Pfp, which is located in front of and separated by the determination distance DL from the regeneration enhancement zone Pr-Ps, so as to obtain the deceleration rate of the vehicle 10 that is greater than that obtained during the free-run control. Then, the vehicle 10 performs the regeneration enhancement control in the regeneration enhancement zone Pr-Ps. This decreases changes in the deceleration rate when shifting the control mode and allows for further smooth deceleration of the vehicle 10 under the regeneration enhancement control.

FIG. 7 shows the control mode for decelerating the vehicle 10 when the accelerator off speed Voff is higher than the stoppable speed Vs and the accelerator is released in the regeneration enhancement zone Pr-Ps. In this case, the travel control unit 42 determines that the accelerator off speed Voff is higher than the stoppable speed Vs (step S1 of FIG. 2: YES) and that the vehicle 10 is located in the regeneration enhancement zone Pr-Ps (step S2 of FIG. 2: NO). Thus, the travel control unit 42 performs the regeneration enhancement control (step S10 of FIG. 2). Due to the regeneration enhancement control, the vehicle 10 continues coasting as decelerating at the constant deceleration rate so that the speed of the vehicle 10 becomes the target speed Vt before reaching the stop position Ps. That is, when the accelerator is released, the vehicle 10 is triggered to perform the regeneration enhancement control so that the speed of the vehicle 10 is decreased to the target speed Vt.

Figure 8:
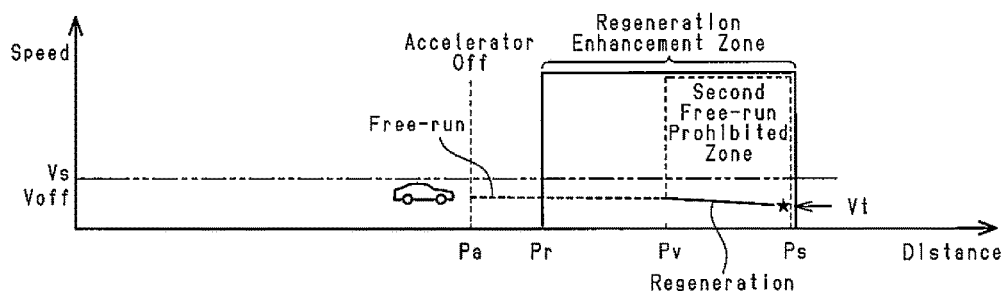
FIG. 8 is a graph showing an example of the deceleration process controlled by the vehicle controller of the embodiment.

FIG. 8 shows the control mode for decelerating the vehicle 10 when the accelerator off speed Voff is lower than or equal to the stoppable speed Vs and the accelerator is released in a location outside the regeneration enhancement zone Pr-Ps. In this case, the travel control unit 42 determines that the accelerator off speed Voff is lower than or equal to the stoppable speed Vs (step S1 of FIG. 2: NO) and that the vehicle 10 is located outside the second free-run prohibited zone Pv-Ps (step S12 of FIG. 2: YES). Thus, the travel control unit 42 performs the free-run control (step S13 of FIG. 2). Due to the free-run control, the vehicle 10 continues coasting with subtle deceleration.

Subsequently, when the vehicle 10 enters the second free-run prohibited zone Pv-Ps (step S14 of FIG. 2: YES), the travel control unit 42 performs the regeneration control (step S15 of FIG. 2). Due to the regeneration control, the vehicle 10 continues coasting as decelerating at the constant deceleration rate so that the speed of the vehicle 10 becomes the target speed Vt before reaching the stop position Ps.

More specifically, when the accelerator is released at the accelerator off speed Voff that is lower than or equal to the stoppable speed Vs, the vehicle 10 is triggered to perform the free-run control outside the second free-run prohibited zone Pv-Ps and performs the regeneration control in the second free-run prohibited zone Pv-Ps. This controls the deceleration to the target speed Vt.

The present embodiment has the advantages described below.

(1) When the vehicle 10 reaches the position Pfp, which is located in front of and separated by the determination distance DL from the regeneration enhancement starting position Pr where the regeneration enhancement control is started, the free-run control is prohibited even when the vehicle is traveling under the free-run control. This controls the traveling of the vehicle 10. Thus, the deceleration rate of the regeneration enhancement control is set after the vehicle 10 is actively decelerated through the regeneration control. This obtains stable combination of the free-run control and the regeneration control including the regeneration enhancement control so that changes in the deceleration rate do not annoy the driver.

(2) When the free-run control is prohibited, the free-run control is shifted to the regeneration control, which obtains the decelerailon rate that is greater than that obtained during the free-run control, and then to the regeneration enhancement control. This limits situations in which changes in the deceleration rate may be annoying to the driver.

(3) The determination distance DL is set to be longer as the accelerator off speed Voff increases. This varies the position Pfp, at which the prohibition of the free-run control is started. Thus, the accuracy for approaching the target speed Vt may be further increased even when the target speed Vt of the vehicle 10 is set so that the vehicle 10 stops at a stop position.

(4) The vehicle speed at the starting point of the free-run control, namely, the accelerator off speed Voff, which is obtained when the accelerator of the vehicle 10 is released, is used to set the determination distance DL. This increases the accuracy for setting the variable determination distance DL.

(5) When the regeneration control is performed in the first free-run prohibited zone Pfp-Pr, which is set between the regeneration enhancement starting position Pr and the position Pfp, which is located in front of and separated by the determination distance DL from the regeneration enhancement starting position Pr, the deceleration rate is variable in accordance with the determination distance DL. This further smoothly changes the deceleration rate until the vehicle 10 starts the regeneration enhancement control.

(6) When the vehicle 10 has passed the position Pfp, at which the free-run control can be performed, the regeneration control is performed in a zone up to the regeneration enhancement starting position Pr. Thus, after the vehicle 10 is decelerated under the regeneration control, the vehicle 10 may be further smoothly decelerated under the regeneration enhancement control.

(7) When the accelerator off speed Voff of the vehicle 10 is lower than or equal to the stoppable speed Vs, the free-run control continues until the vehicle 10 enters the second free-run prohibited zone Pv-Ps, where the free-run control is stopped. This improves the travel control of the vehicle 10 in terms of environmental and economic aspects.

(8) Even when the target stop position Ps is set at an intersection at which the vehicle 10 needs to be stopped once, a railroad crossing, or the like, the regeneration enhancement starting position Pr, which is necessary to stop the vehicle 10 at the stop position Ps, is set based on the pre-enhancement speed Vr of the vehicle 10, which corresponds to the speed of the vehicle 10 before the regeneration enhancement control is started, and the remaining distance "Ps-Pr", which corresponds to a distance needed to decrease the vehicle speed from the pre-enhancement speed Vr to the target speed Vt so that the vehicle 10 stops at the stop position Ps. This accurately sets the regeneration enhancement starting position Pr for the traveling control of the vehicle.

It should be apparent to those skilled in the art that the present disclosure may be embodied in many other specific forms without departing from the scope of the disclosure. Particularly, it should be understood that the present disclosure may be embodied in the following forms.

In the above embodiment, the regeneration enhancement starting position Pr is calculated based on the pre-enhancement speed Vr, which corresponds to the speed before the regeneration enhancement control is performed, and the remaining distance "Ps-Pr", which is needed to decrease the vehicle speed from the pre-enhancement speed Vr to the target speed Vt. Instead, when the regeneration enhancement starting position Pr is fixed regardless of the speed of the vehicle 10, the deceleration rate may be adjusted by changing the regeneration amount obtained through the regeneration control.

In the above embodiment, the determination distance DL, which is located before the regeneration enhancement starting position Pr, is set to be longer as the speed of the vehicle 10 increases. Instead, the determination distance DL may be fixed regardless of the speed of the vehicle 10. In this case, the deceleration rate may be adjusted by changing the regeneration amount obtained through the regeneration control.

In the above embodiment, when the speed of the vehicle 10 is lower than or equal to the stoppable speed Vs, the free-run control is continued. However, the continuous process of the free-run control based on the determination whether or not the speed of the vehicle 10 is higher than the stoppable speed Vs may be omitted.

In the above embodiment, the free-run control, in which the vehicle 10 travels with no regeneration, is performed during coasting. Instead, the free-run control in which the vehicle 10 travels as regenerating electricity the amount of which is smaller than that obtained during the regeneration control may be performed during coasting. For example, the free-run control regenerates electricity the amount of which corresponds to an auxiliary apparatus load that is needed to operate the auxiliary apparatus.

In the above embodiment, the CAN is illustrated as the in-vehicle network NW. However, the in-vehicle network NW only needs to connect the ECU and the like in a communicable manner. More specifically, the in-vehicle network NW may be configured by another network such as Ethernet (registered trademark), FlexRay (registered trademark), or IEE1394 (FireWire (registered trademark)). Alternatively, the in-vehicle network NW may include CAN and be configured by combination of the networks.

In the above embodiment, the state detection unit 20 is connected to the navigation control device 31 by the in-vehicle network NW. Instead, the state detection unit 20 may be directly connected to the navigation control device 31.

In the above embodiment, the navigation system 30 and the travel assist unit 41 are separately configured. Instead, the navigation system and the travel assist unit may be arranged in the same apparatus.

In the above embodiment, the hybrid control device 40 and the travel assist unit 41 are arranged in the same apparatus. Instead, the hybrid control device and the travel assist unit may be arranged in different apparatuses.

In the above embodiment, the devices such as the navigation system 30 and the HMIs 60 are integrated with the vehicle 10. Instead, the functions of devices including the navigation system and the HMI may be entirely or partially implemented by a portable information processing device such as a mobile phone or a smartphone as long as the devices are connected to one another in a communicable manner.

In the above embodiment, the travel assist unit 41, the navigation system 30, the map information database 34, and the like are mounted in the vehicle 10. Instead, an external information processing device or a portable information processing device may partially include the functions of the travel assist unit, the navigation system, the map information database, and the like. An example of the external information processing device is an information processing center. Examples of the portable information processing device are a mobile phone and a smartphone. The eternal information processing device may exchange information through a wireless communication line. The mobile information processing device may be connected to the in-vehicle network or through a near field communication or exchange information through a wireless communication line.

In the above embodiment, the travel assist unit 41 performs the process for decelerating the vehicle 10. Instead, the process for decelerating the vehicle 10 may be performed by the navigation control device or the like.

In the above embodiment, the vehicle 10 is illustrated as a hybrid vehicle. However, the vehicle only needs to include a motor as a drive source and be capable of traveling with electricity supplied from a battery and thus may be an electric vehicle.

The present examples and embodiments are to be considered as illustrative and not restrictive, and the disclosure is not to be limited to the details given herein, but may be modified within the scope and equivalence of the appended claims.

The invention claimed is:

1. A vehicle controller comprising
a processor configured to:
perform regeneration control on a vehicle when the vehicle is in an accelerator off state;
obtain a stop position of the vehicle from map data;
set a regeneration enhancement zone before the stop position;
perform regeneration enhancement control, which increases a regenerative electric power amount of the vehicle, when the vehicle is in the accelerator off state and located in the regeneration enhancement zone;

perform free-run control, which controls free-run of the vehicle so that the regenerative electric power amount is decreased, when the vehicle is in the accelerator off state and satisfies a free-run condition; and set a free-run prohibited zone when a vehicle speed that is obtained when an accelerator of the vehicle is released is larger than a speed at which the vehicle is stoppable at the stop position, the free-run prohibited zone being a zone where a direct change from the free-run control to the regeneration enhancement control is prohibited, between a starting point of the regeneration enhancement zone and a position that is located in front of and separated by a determination distance from the starting point;

wherein in the free-run prohibited zone, the processor performs the regeneration control to obtain a deceleration rate of the vehicle that is greater than that obtained by the free-run control.

2. The vehicle controller according to claim 1, wherein the processor is configured to set the determination distance to be longer as a vehicle speed increases.

3. The vehicle controller according to claim 2, wherein the processor is configured to use a vehicle speed that is obtained when an accelerator of the vehicle is released as the vehicle speed used to set the determination distance.

4. The vehicle controller according to claim 2, wherein the processor is configured to perform the regeneration control in the free-run prohibited zone so that the deceleration rate of the vehicle is variable in accordance with the determination distance.

5. The vehicle controller according to claim 1, wherein the processor is configured to perform the regeneration control in the free-run prohibited zone when an accelerator of the vehicle is released in the free-run prohibited zone.

6. The vehicle controller according to claim 1, wherein
the free-run prohibited zone includes a first free-run prohibited zone,
the processor is configured to set a second free-run prohibited zone before the stop position so that the vehicle, which is traveling under the free-run control, is stoppable at the stop position, and
when the vehicle speed that is obtained when the accelerator of the vehicle is released is lower than or equal to the speed at which the vehicle is stoppable at the stop position, the processor is configured to continue the free-run control until the vehicle enters the second free-run prohibited zone.

7. The vehicle controller according to claim 1, wherein the processor is configured to:
perform the regeneration enhancement control that decreases a vehicle speed to a target speed that is set to stop the vehicle at the stop position, and
calculate the starting point of the regeneration enhancement zone based on a deceleration rate obtained by the regeneration enhancement control, a pre-enhancement speed, which is a vehicle speed obtained before the regeneration enhancement control is performed, and a remaining distance, which is needed to decrease the vehicle speed from the pre-enhancement speed to the target speed.

* * * * *